United States
Maisubara

[11] 3,718,384
[45] Feb. 27, 1973

[54] ACCURATE LENS SYSTEMS FOR PRODUCING AN EXTREMELY SMALL IMAGE IN A REDUCED SCALE

[75] Inventor: Masaki Maisubara, Tokyo, Japan
[73] Assignee: Olympus Optical Company Limited, Shibuya-ku, Tokyo, Japan
[22] Filed: March 17, 1972
[21] Appl. No.: 235,743

[52] U.S. Cl. .............................................. 350/215
[51] Int. Cl. ............................................. G02b 9/62
[58] Field of Search ................................. 350/215

[56] References Cited

UNITED STATES PATENTS

| | | | |
|---|---|---|---|
| 2,701,982 | 2/1955 | Angenieux | 350/215 |
| 3,488,108 | 1/1970 | Lai | 350/215 |

*Primary Examiner*—John K. Corbin
*Attorney*—Eric H. Waters et al.

[57] ABSTRACT

An accurate lens system for producing an extremely small image in a reduced scale, which is constructed as 6 components and 8 lenses and consists of first and second components of positive meniscus lenses, each component consisting of a single lens, third and fourth components of negative lenses, each component consisting of two lenses made integral into a unit lens, and fifth and sixth components of positive lenses, each component consisting of a single lens, all lenses being arranged in succession from the side of an object, and which is defined by the following five conditions, i.e.

$$0.51f \leq |f_4| \leq 0.64f \text{ and } f_4 < 0; \quad \text{(I)}$$

$$0.16f \leq (d_8 + d_9) \leq 0.19f; \quad \text{(II)}$$

$$0.22f \leq d_7 \leq 0.29f; \quad \text{(III)}$$

$$0.19 \leq (|r_7| + |r_8|/2) \leq 0.24f; \text{ and} \quad \text{(IV)}$$

$$0.64f \leq f_5 \leq 0.8f \quad \text{(V)}$$

where $r_1, r_2, \ldots r_{14}$ are radii of curvatures of the successive lens faces counted from an object, $d_1, d, \ldots d_{13}$ are air spaces between the successive lenses or axial thicknesses of the successive lenses, $f_1, f_2, \ldots f_6$ are focal lengths of the successive lenses, and $f$ is a composite focal length of the total lens system.

3 Claims, 14 Drawing Figures

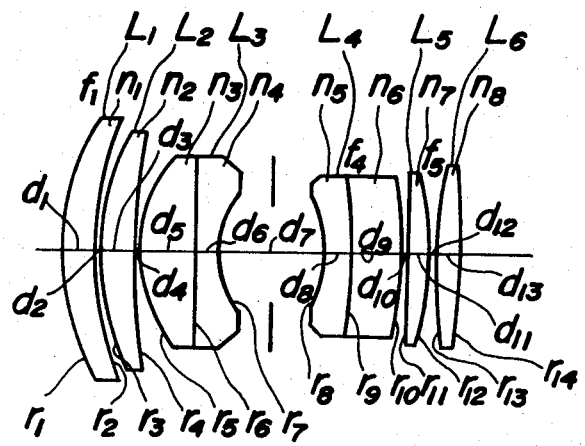
FIG_1
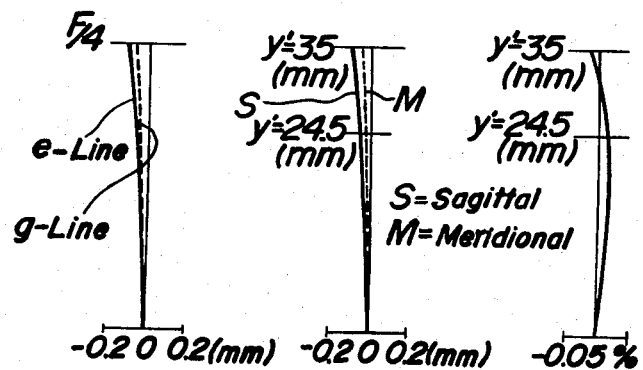
FIG.2a  FIG.2b  FIG.2c
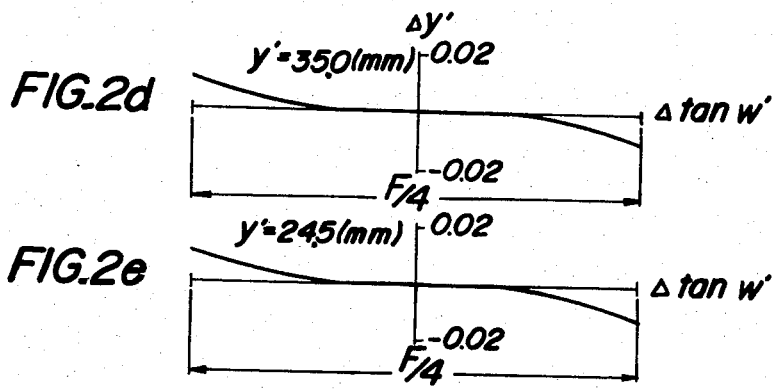
FIG.2d
FIG.2e

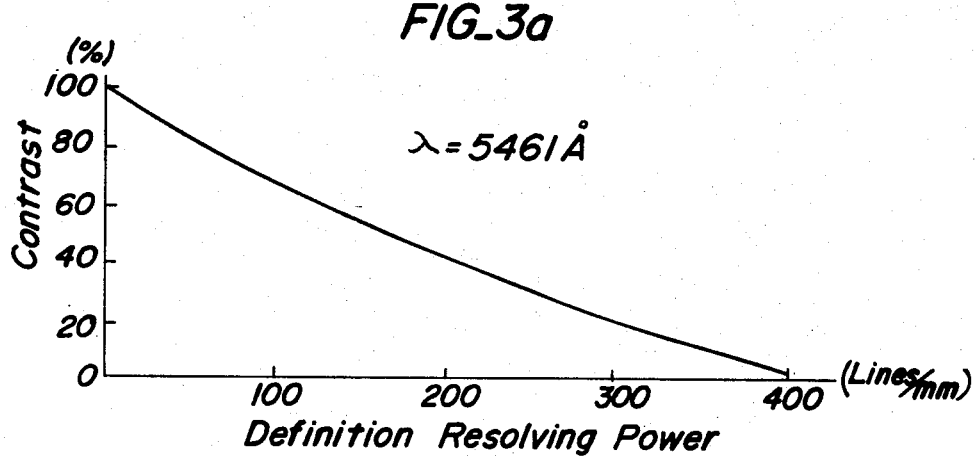
FIG_3a
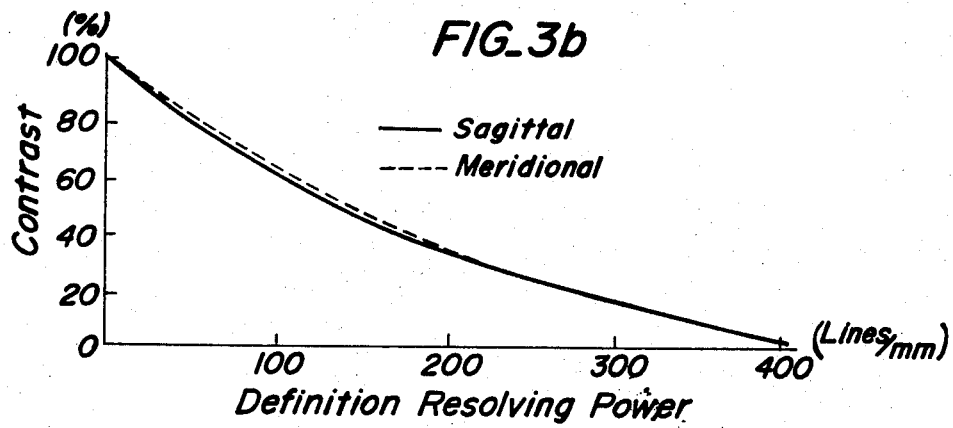
FIG_3b
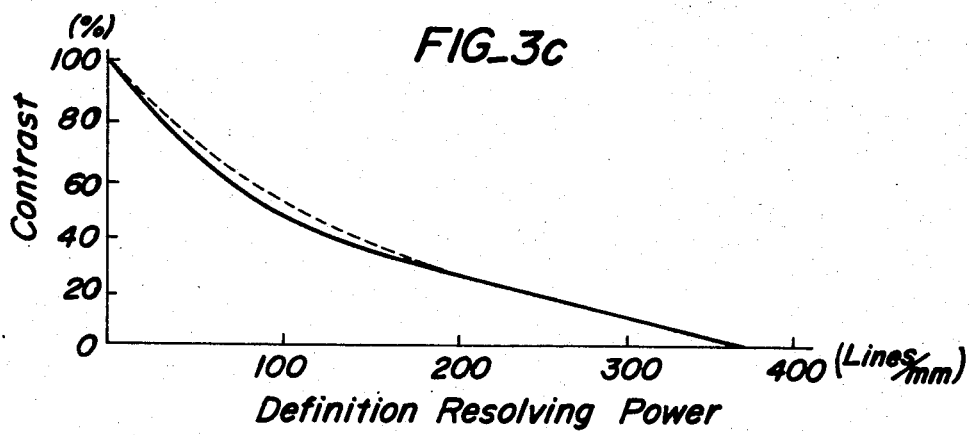
FIG_3c

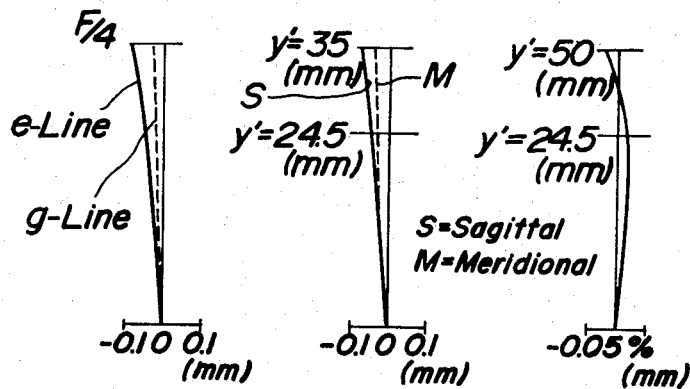
FIG_4a  FIG_4b  FIG_4c
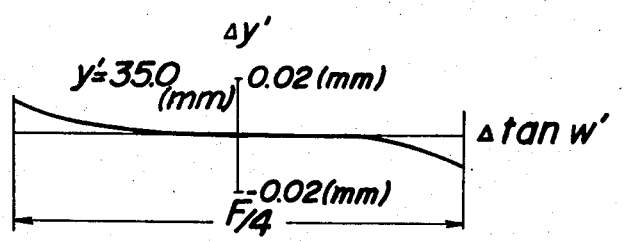
FIG_4d
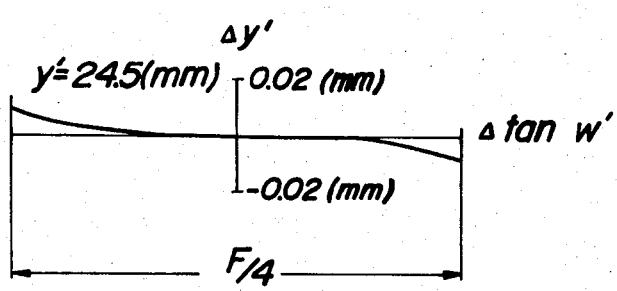
FIG_4e

ACCURATE LENS SYSTEMS FOR PRODUCING AN EXTREMELY SMALL IMAGE IN A REDUCED SCALE

This invention relates to accurate lens systems for producing an extremely small image in a reduce scale.

As one of the steps of manufacturing a semi-conductor integral circuit, for example, there is a step of producing the image of an extremely small pattern in a reduced scale onto the surface of an integral circuit. For this purpose, it is required to use an accurate lens system having an excellent definition resolving power and for producing an extremely small image in a reduced scale. The image produced by the conventional lens system which has heretofore been used for this purpose, however, has a wide picture surface whose definition resolving power at the periphery thereof is not sufficient enough to satisfy the purpose aimed.

The object of the invention, by adopting suitable dimensions for successive groups of lenses and suitable combination and arrangement thereof, is to obtain a high definition resolving power from the center up to the periphery of the picture surface of the image.

A feature of the invention is the provision of a lens system constructed as six components and eight lenses, which consists of first and second components of positive meniscus lenses, each component consisting of a single lens, third and fourth components of negative meniscus lenses, each component consisting of two lenses made integral into a unit lens, and fifth and six components of positive lenses, each component consisting of a single lens, all lenses being arranged in succession from the side of an object, and which is defined by the following five conditions, i.e.

$$0.51f \leq |f_4| \leq 0.64f \text{ and } f_4 < 0; \quad \text{(I)}$$

$$0.16f \leq (d_8 + d_9) \leq 0.19f; \quad \text{(II)}$$

$$0.22f \leq d_7 \leq 0.29f; \quad \text{(III)}$$

$$0.19f \leq (|r_7| + |r_8|/2) \leq 0.24f; \text{ and} \quad \text{(IV)}$$

$$0.64f \leq f_5 \leq 0.8f \quad \text{(V)}$$

where $r_1, r_2, \ldots r_{14}$ are radii of curvatures of the successive lens faces counted from an object, $d_1, d_2, \ldots d_{13}$ are air spaces between the successive lenses or axial thicknesses of the successive lenses, $f_1, f_2, \ldots f_6$ are focal lengths of the successive lenses, and f is a composite focal length of the total lens system.

For a better understanding of the invention, the same will be explained by reference to the accompanying drawings, in which:

FIG. 1 shows in cross-section a lens system constructed according to the invention;

FIGS. 2a – 2e show aberration characteristic curves of one embodiment of the invention;

FIGS. 3a – 3c show response function curves illustrating a high definition resolving power of the same embodiment of the invention; and FIGS. 4a – 4e show aberration characteristic curves of another embodiment of the invention.

Referring to the drawings, a lens system constructed in accordance with the invention is shown in FIG. 1 in which $L_1$ and $L_2$ designate first and second components of positive meniscus lenses, each component consisting of a single lens, $L_3$ and $L_4$ show third and fourth components of negative meniscus lenses, each component consisting of two lenses made integral into a unit lens, and $L_5$ and $L_6$ illustrate fifth and sixth components of positive lenses, each component consisting of a single lens.

In such kind of lens systems, it has been the common practice to use monochromatic light for the purpose of avoiding the influence of the chromatic aberration and hence of obtaining the high definition resolving power.

The present invention makes use as a standard wave length of e-line (having a wave length of 546.1 m$\mu$), which has been generalized in recent years in the lens systems for producing an extremely small image in a reduced scale and effects correction of the chromatic aberration in certain degree for the light whose wave length is close by that of the e-line. As a result of this, an accurate lens system for producing an extremely small image in a reduced scale is obtained with $f = 157$ mm, magnification of 1/25× and definition resolving power of higher than 350 lines/mm for the image whose dimension of the picture surface is 70 mm$\phi$.

In order to make the definition resolving power up to the periphery of the picture surface of the image higher than 350 lines/mm, it is necessary to considerably decrease the aberration at the periphery of the picture surface of the image. Thus, in accordance with the invention the convex lenses facing the object and image of the conventional Gauss type lens constructed as four components and six lenses are divided into two components of convex lenses, respectively, resulting in six components in total and hence decreasing the degree of correction required for each lens. The wide picture surface of the image as is produced by the lens according to the invention rapidly increases the curvature and coma on the sagittal image surface to reduce the definition resolving power. Thus, it is important to provide means enabling a suppression of the curvature and coma on the sagittal image surface to be obtained.

Many attempts have been made to overcome this problem, but hitherto none has led to fully satisfactory results. In accordance with the invention in the first place the fourth component of lenses $L_4$ are designed to satisfy the condition I that $0.51f \leq |f_4| \leq 0.64f$ and $f_4 < 0$ thereby obtaining a relatively strong refractive power and also satisfy the condition II that $0.16f \leq (d_8 + d_9) \leq 0.19f$, which makes it possible to obtain a relatively thick lens. As a result of this, said curvature and coma on the sagittal image surface can reliably be corrected. Secondly, the air space $d_7$ between the third component of lenses $L_3$ and the fourth component of lenses $L_4$ as well as the radii of curvatures $r_7$ and $r_8$ of the positive and negative meniscus lenses $L_3$ and $L_4$ are chosen such that both the condition III that $0.22f \leq d_7 \leq 0.29f$ and the condition IV that $0.19f \leq (|r_7| + |r_8|/2) \leq 0.24f$ are satisfied thus resulting in a suppression of coma flare and a good balanced state of astigmatism.

If $f_4$ and $(d_8 + d_9)$ become increased beyond the upper limits of the conditions I and II, the refractive power is reduced and the curvature on the sagittal image surface is increased to such an extent that correction thereof could not be obtained. If $f_4$ and $(d_8 + d_9)$ become decreased below the lower limits of the conditions I and II, the coma on the sagittal image surface becomes so intense that its correction could not be attained by the conditions III and IV thus resulting in an unbalanced state of correction of aberrations by the lens system as a whole.

If $d_7$ becomes increased beyond the upper limit $0.29f$ of the condition III, the coma flare can be prevented while the astigmatism is so increased that the correction thereof becomes impossible. On the contrary, if $d_7$ becomes decreased less than the lower limit $0.22f$, the coma flare could not be prevented.

The condition IV that $0.19f \leq (|r_7| + |r_8|/2) \leq 0.24f$ serves to maintain the coma flare and the curvature on the image surface in a balanced state. If $(|r_7| + |r_8|/2)$ becomes increased beyond the upper limit $0.24f$ or is decreased less than the lower limit $0.19f$, the coma flare and the curvature on the image surface become out of balance.

The fourth component of lenses $L_4$ satisfying the condition I that $0.51f \leq |f_4| \leq 0.64$ and $f_4 < 0$ and hence having a strong refractive power causes the radius of curvature $r_{10}$ at the image side to decrease with the result that there occurs a negative distortion. The condition V that $0.64f \leq f_5 \leq 0.8f$ serves to correct the negative distortion caused by the fourth component of lenses $L_4$.

The invention will now be described with reference to practical examples whose results are obtained by effecting corrections under the above mentioned five conditions I - V.

Example 1

The lens system constructed in accordance with this example 1 is shown in FIG. 1.

In the present example, the composite focal length of the total lens system $f$ is 156.9 mm, the aperture ratio is F/4, the magnification is 1/25×, the dimension of the picture surface is 70 mm$\phi$, the position of an object is 3,943.0 mm from the front face of the lens system, and the position of an image is 46.2 mm from the rear face of the lens system. In the following Table $n_1, n_2, \ldots n_8$ are refractive indexes for the e-line of the successive lenses counted from the side of the object and $\nu_1, \nu_2, \ldots \nu_8$ are Abbe's numbers for the d-line.

| | | | |
|---|---|---|---|
| $r_1$=92.92 | | | |
| | $d_1$=12.0 | $n_1$=1.65425 | $\nu_1$=58.67 |
| $r_2$=127.47 | | | |
| | $d_2$=0.6 | | |
| $r_3$=75.95 | | | |
| | $d_3$=13.0 | $n_2$=1.65425 | $\nu_2$=58.67 |
| $r_4$=240.63 | | | |
| | $d_4$=0.6 | | |
| $r_5$=49.2 | | | |
| | $d_5$=19.0 | $n_3$=1.62555 | $\nu_3$=58.14 |
| $r_6$=∞ | | | |
| | $d_6$=7.0 | $n_4$=1.69417 | $\nu_4$=31.08 |
| $r_7$=30.58 | | | |
| | $d_7$=39.9 | | |
| $r_8$=−36.35 | | | |
| | $d_8$=8.5 | $n_5$=1.58566 | $\nu_5$=46.33 |
| $r_9$=−248.79 | | | |
| | $d_9$=18.0 | $n_6$=1.64129 | $\nu_6$=55.38 |
| $r_{10}$=−173.12 | | | |
| | $d_{10}$=0.6 | | |
| $r_{11}$=892.34 | | | |
| | $d_{11}$=9.2 | $n_7$=1.66123 | $\nu_7$=53.44 |
| $r_{12}$=−82.81 | | | |
| | $d_{12}$=0.6 | | |
| $r_{13}$=176.97 | | | |
| | $d_{13}$=8.0 | $n_8$=1.66123 | $\nu_8$=53.44 |
| $r_{14}$=−238.76 | | | |

Various aberration characteristic curves of the present embodiment are shown in FIGS. 2a - 2e. FIG. 2a shows the spherical aberrations in which the full line shows the spherical aberration at the e-line, while the dotted lines show the spherical aberration at the g-line. FIG. 2b shows the astigmatism in which the full line shows the sagittal astigmatism, while the dotted lines show the meridional astigmatism. FIG. 2c shows the distortion. FIGS. 2d and 2e show the meridional comas at $y' = 35$ mm and $y' = 24.5$ mm, respectively. $y'$ is the height of the image.

As seen from these aberration characteristic curves, the lens system according to the present embodiment makes it possible to significantly correct various aberrations.

The response functions on axis, at the picture surface whose dimension is 50 mm$\phi$, and at the picture surface whose dimension is 70 mm$\phi$ for the wave length $\lambda = 5,461$ A are shown in FIGS. 3a, 3b and 3c, respectively. In FIGS. 3b and 3c the full line shows the sagittal response function and dotted lines show the meridional response function. As seen from these response curves, the lens system according to the present embodiment has a high definition resolving power of 350 lines/mm from the center (on axis) up to the periphery of the picture surface of the image and is particularly useful as an accurate lens for producing an extremely small image in a reduced scale.

The Seidel coefficients of the lens system as described in the present Example 1 are listed in Berek's expression as follows.

| | $A\nu$ | $B\nu$ | $\Gamma\nu$ | $P\nu$ | $\square\nu$ |
|---|---|---|---|---|---|
| 1 | 1.2592 | 0.0746 | −0.3064 | 0.6938 | −0.1870 |
| 2 | −0.0637 | −0.0131 | 0.0289 | −0.5058 | −0.2352 |
| 3 | 0.7198 | 0.0126 | −0.0954 | 0.8488 | −0.1142 |
| 4 | 0.2245 | 1.4669 | −0.5739 | −0.2679 | −3.0649 |
| 5 | −0.2030 | −0.0005 | −0.0102 | 1.2750 | 0.0639 |
| 6 | −0.4844 | −0.6082 | 0.5428 | 0 | 0.6815 |
| 7 | −0.2574 | −0.0394 | −0.1008 | −2.1843 | −0.8705 |
| 8 | −1.6551 | −0.3083 | 0.7143 | −1.6562 | 0.8478 |
| 9 | −0.0003 | −0.0131 | 0.0020 | −0.0140 | 0.1802 |
| 10 | 0.0211 | 0.3237 | −0.0826 | 0.3679 | −2.7118 |
| 11 | −0.0014 | −0.3434 | 0.0222 | 0.0727 | 4.1802 |
| 12 | 0.3061 | 0.2062 | −0.0895 | 0.7835 | −0.2369 |
| 13 | −0.0181 | −0.6274 | 0.1065 | 0.3666 | 1.5366 |
| 14 | 0.2764 | 0.0443 | −0.1107 | 0.2718 | −0.1266 |
| Σ | 0.2136 | −0.0050 | −0.0106 | 0.0519 | −0.0568 |

As seen from the above Table, the total sum Σ of each of the Seidel coefficients is substantially zero which shows that the aberrations are significantly corrected.

Example 2

In the present Example 2, f is 156.3 mm, the aperture ration is F/4, the magnification is 1/25×, the dimension of the picture surface is 70 mm$\phi$, the object is positioned at 3,943.6 mm from the front face of the lens system and the image is positioned at 45.7 mm from the rear face of the lens system. $r_1$ to $r_{14}$, $d_1$ to $d_{13}$, $n_1$ to $n_8$ and $\nu_1$ to $\nu_8$ of the present example are as follows.

| | | | |
|---|---|---|---|
| $r_1$=88.57 | | | |
| | $d_1$=12.0 | $n_1$=1.65425 | $\nu_1$=58.67 |
| $r_2$=153.33 | | | |
| | $d_2$=0.6 | | |
| $r_3$=76.72 | | | |
| | $d_3$=13.0 | $n_2$=1.65425 | $\nu_2$=58.67 |
| $r_4$=183.62 | | | |
| | $d_4$=0.6 | | |
| $r_5$=50.69 | | | |
| | $d_5$=19.0 | $n_3$=1.62555 | $\nu_3$=58.14 |
| $r_6$=613.38 | | | |
| | $d_6$=7.0 | $n_4$=1.69417 | $\nu_4$=31.08 |
| $r_7$=29.60 | | | |

| | $d_7=39.0$ | | |
|---|---|---|---|
| $r_8=-38.94$ | | | |
| $d_8=8.5$ | | $n_5=1.58566$ | $\nu_5=46.33$ |
| $r_9=-259.71$ | | | |
| | $d_9=18.0$ | $n_6=1.64129$ | $\nu_6=55.38$ |
| $r_{10}=-166.92$ | | | |
| | $d_{10}=0.6$ | | |
| $r_{11}=442.83$ | | | |
| | $d_{11}=9.2$ | $n_7=1.66123$ | $\nu_7=53.44$ |
| $r_{12}=-84.62$ | | | |
| | $d_{12}=0.6$ | | |
| $r_{13}=206.10$ | | | |
| | $d_{13}=8.0$ | $n_8=1.66123$ | $\nu_8=53.44$ |
| $r_{14}=0302.26$ | | | |

The spherical aberration, astigmatism, distortion, and meridional comas at $y' = 35.0$ and $y' = 24.5$ are shown in FIGS. 4a to 4e, respectively. As seen from these aberration curves, the lens system according to the present example also makes it possible to reliably correct various aberrations. The seidel coefficients of the lens system as described in the present Example 2 are listed in Berek's expression as follows.

| | $A\nu$ | $B\nu$ | $\Gamma\nu$ | $P\nu$ | $\Box\nu$ |
|---|---|---|---|---|---|
| 1 | 1.4466 | 0.4419 | −0.4077 | 0.7283 | −0.2376 |
| 2 | 0.0166 | 0.0341 | 0.0238 | −0.4206 | −0.5539 |
| 3 | 0.3041 | 0.0006 | −0.0140 | 0.8407 | −0.0388 |
| 4 | 0.1534 | 1.3467 | −0.4545 | −0.3513 | −2.9494 |
| 5 | −0.2592 | −0.0059 | −0.0393 | 1.2380 | 0.1866 |
| 6 | −0.3709 | −0.5283 | 0.4426 | 0.0066 | 0.6225 |
| 7 | −0.3411 | −0.0480 | −0.1279 | −2.2573 | −0.8645 |
| 8 | −1.4360 | −0.3702 | 0.7291 | −1.5469 | 0.9733 |
| 9 | −0.0003 | −0.0139 | 0.0021 | −0.0134 | 0.1769 |
| 10 | 0.0265 | 0.3347 | −0.0942 | 0.3817 | −2.5460 |
| 11 | −0.0010 | −0.3689 | 0.0193 | 0.1466 | 4.2425 |
| 12 | 0.3392 | 0.0230 | −0.0884 | 0.7671 | −0.2060 |
| 13 | −0.0313 | −0.5964 | 0.1367 | 0.3150 | 1.2280 |
| 14 | 0.2500 | 0.0784 | −0.1401 | 0.2148 | −0.1642 |
| Σ | 0.0965 | 0.0010 | −0.0125 | 0.0492 | −0.1306 |

As seen from the above Table, the total sum Σ of each of the Seidel coefficients is substantially zero which shows that the aberrations are significantly corrected.

What is claimed is:

1. A lens system constructed as six components and eight lenses, which consists of first and second components positive meniscus lenses, each component consisting of a single lens, third and fourth components of negative meniscus lenses, each component consisting of two lenses made integral into a unit lens, and fifth and six groups of positive lenses, each component consisting of a single lens, all lenses being arranged in succession from the side of an object, and which satisfies the following five conditions, i.e.

$$0.51f \leq |f_4| \leq 0.64f \text{ and } f_4 < 0; \quad (I)$$

$$0.16f \leq (d_8 + d_9) \leq 0.19f; \quad (II)$$

$$0.22f \leq d_7 \leq 0.29f; \quad (III)$$

$$0.19f \leq (|r_7| + |r_8|/2) \leq 0.24f; \text{ and} \quad (IV)$$

$$0.64f \leq f_5 \leq 0.8f \quad (V)$$

where $r_1, r_2, \ldots r_{14}$ are radii of curvatures of the successive lens faces counted from an object, $d_1, d_2, \ldots d_{13}$ are air spaces between the successive lenses or axial thicknesses of the successive lenses, $f_1, f_2, \ldots f_6$ are focal lengths of the successive lenses, and f is a composite focal length of the total lens system.

2. A lens system as claimed in claim 1, wherein f is 156.9 mm, the aperture ratio is F/4, the magnification is 1/25×, the dimension of the picture surface of the image is 70 mm$\phi$, an object is positioned at 3,943.0 mm from the front face of the lens system and an image is positioned at 46.2 mm from the rear face of the lens system and $r_1$ to $r_{14}$, $d_1$ to $d_{13}$, $n_1$ to $n_8$ and $\nu_1$ to $\nu_8$ are defined by the following values,

| | | | |
|---|---|---|---|
| $r_1=92.92$ | | | |
| | $d_1=12.0$ | $n_1=1.65425$ | $\nu_1=58.67$ |
| $r_2=127.47$ | | | |
| | $d_2=0.6$ | | |
| $r_3=75.95$ | | | |
| | $d_3=13.0$ | $n_2=1.65425$ | $\nu_2=58.67$ |
| $r_4=240.63$ | | | |
| | $d_4=0.6$ | | |
| $r_5=49.2$ | | | |
| | $d_5=19.0$ | $n_3=1.62555$ | $\nu_3=58.14$ |
| $r_6=\infty$ | | | |
| | $d_6=7.0$ | $n_4=1.69417$ | $\nu_4=31.08$ |
| $r_7=30.58$ | | | |
| | $d_7=39.9$ | | |
| $r_8=-36.35$ | | | |
| | $d_8=8.5$ | $n_5=1.58566$ | $\nu_5=46.33$ |
| $r_9=-248.79$ | | | |
| | $d_9=18.0$ | $n_6=1.64129$ | $\nu_6=55.38$ |
| $r_{10}=-173.12$ | | | |
| | $d_{10}=0.6$ | | |
| $r_{11}=892.34$ | | | |
| | $d_{11}=9.2$ | $n_7=1.66123$ | $\nu_7=53.44$ |
| $r_{12}=-82.81$ | | | |
| | $d_{12}=0.6$ | | |
| $r_{13}=176.97$ | | | |
| | $d_{13}=8.0$ | $n_8=1.66123$ | $\nu_8=53.44$ |
| $r_{14}=-238.76$ | | | | where $\nu_1$ to $\nu_8$ are Abbe's numbers for the d-line.

3. A lens system as claimed in claim 1, wherein f is 156.3 mm, the aperture ratio is F/4, the magnification is 1/25×, the dimension of the picture surface of the image is 70 mm$\phi$, an object is positioned at 3,943.0 mm from the front face of the lens system and an image is positioned at 45.7 mm from the rear face of the lens system and $r_1$ to $r_{14}$, $d_1$ to $d_{13}$, $n_1$ to $n_8$ and $\nu_1$ to $\nu_8$ are defined by the following values,

| | | | |
|---|---|---|---|
| $r_1=88.57$ | | | |
| | $d_1=12.0$ | $n_1=1.65425$ | $\nu_1=58.67$ |
| $r_2=153.33$ | | | |
| | $d_2=0.6$ | | |
| $r_3=76.72$ | | | |
| | $d_3=13.0$ | $n_2=1.65425$ | $\nu_2=58.67$ |
| $r_4=183.62$ | | | |
| | $d_4=0.6$ | | |
| $r_5=50.69$ | | | |
| | $d_5=19.0$ | $n_3=1.62555$ | $\nu_3=58.14$ |
| $r_6=613.38$ | | | |
| | $d_6=7.0$ | $n_4=1.69417$ | $\nu_4=31.08$ |
| $r_7=29.60$ | | | |
| | $d_7=39.0$ | | |
| $r_8=-38.94$ | | | |
| | $d_8=8.5$ | $n_5=1.58566$ | $\nu_5=46.33$ |
| $r_9=-259.71$ | | | |
| | $d_9=18.0$ | $n_6=1.64129$ | $\nu_6=55.38$ |
| $r_{10}=-166.92$ | | | |
| | $d_{10}=0.6$ | | |
| $r_{11}=442.83$ | | | |
| | $d_{11}=9.2$ | $n_7=1.66123$ | $\nu_7=53.44$ |
| $r_{12}=-84.62$ | | | |
| | $d_{12}=0.6$ | | |
| $r_{13}=206.10$ | | | |
| | $d_{13}=8.0$ | $n_8=1.66123$ | $\nu_8=53.44$ |
| $r_{14}=0302.26$ | | | |

* * * * *

UNITED STATES PATENT OFFICE
CERTIFICATE OF CORRECTION

Patent No. 3,718,384     Dated February 27, 1973

Inventor(s) Masaki Matsubara

It is certified that error appears in the above-identified patent and that said Letters Patent are hereby corrected as shown below:

On the cover sheet insert -- [30] Foreign Application Priority Data   March 19, 1971   Japan   15046/71 --;

[73] "Masaki Maisubara" should read -- Masaki Matsubara --.

Signed and sealed this 1st day of January 1974.

(SEAL)
Attest:

EDWARD M. FLETCHER, JR.
Attesting Officer

RENE D. TEGTMEYER
Acting Commissioner of Patents